(12) United States Patent
Nakai et al.

(10) Patent No.: US 7,655,060 B2
(45) Date of Patent: *Feb. 2, 2010

(54) DUST COLLECTION UNIT FOR ELECTRIC VACUUM CLEANER AND UPRIGHT ELECTRIC VACUUM CLEANER

(75) Inventors: Koichi Nakai, Hyogo (JP); Atsuo Hamada, Hyogo (JP); Kazumasa Kamatani, Hyogo (JP); Kazuyoshi Yoshimi, Hyogo (JP); Akihiro Yoneyama, Hyogo (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 562 days.

This patent is subject to a terminal disclaimer.

(21) Appl. No.: 11/543,263

(22) Filed: Oct. 5, 2006

(65) Prior Publication Data

US 2007/0084165 A1 Apr. 19, 2007

Related U.S. Application Data

(63) Continuation-in-part of application No. 11/149,151, filed on Jun. 10, 2005, now Pat. No. 7,175,682, which is a continuation of application No. 10/321,430, filed on Dec. 18, 2002, now Pat. No. 7,014,675.

(30) Foreign Application Priority Data

Dec. 28, 2001 (JP) ............................. 2001-399354

(51) Int. Cl.
*B01D 50/00* (2006.01)

(52) U.S. Cl. .............................. 55/429; 55/433; 55/502; 55/DIG. 3; 15/350; 15/352; 15/353

(58) Field of Classification Search .................. 55/337, 55/429, 433, 502, DIG. 3; 15/350, 352, 353
See application file for complete search history.

(56) References Cited

U.S. PATENT DOCUMENTS

| 6,607,572 B2 | 8/2003 | Gammack et al. |
| 7,329,295 B2 * | 2/2008 | Greene et al. .................. 55/337 |
| 7,404,231 B2 * | 7/2008 | Kang ........................... 15/353 |

FOREIGN PATENT DOCUMENTS

| CN | 1492742 A | 4/2004 |
| JP | 531-20850 A | 10/1978 |
| JP | 2004-528876 A | 8/2004 |

* cited by examiner

*Primary Examiner*—Robert A Hopkins
(74) *Attorney, Agent, or Firm*—Westerman, Hattori, Daniels & Adrian, LLP

(57) ABSTRACT

An electric vacuum cleaner is equipped with a dust collection unit (20) that can be detachably installed in the air passage en route from a suction unit to an electric fan of the cleaner. The dust collection unit (20) comprises a dust collecting case (21) for accumulating dust sucked in, a lid member (32) that can be opened to discharge the accumulated dust; and a lock mechanism (clamp lever) (33) for locking the lid member 32 tightly closed. The dust collection unit (20) is further provided with a hand grip (24), arranged to face said user, thereby facilitating a user to hold the dust collection unit when discharging dust from the bottom of the dust collecting case. Further, a hinge (31) is arranged at a position which is adjacent to said bottom (32) of said dust collecting case (21) facing the user holding the hand grip. Furthermore, a lock mechanism (33) is arranged near the periphery of the lid member (32) and at a position opposite to the hinge.

17 Claims, 19 Drawing Sheets

(SECTION ON A – A)

DUST COLLECTION UNIT FOR ELECTRIC VACUUM CLEANER AND UPRIGHT ELECTRIC VACUUM CLEANER

FIELD OF THE INVENTION

The invention relates to an electric vacuum cleaner equipped with a dust collection unit, installed in a suction passage en route from a suction unit to an electric fan, the dust collection unit having a dust collecting case that can be opened by opening a lid member thereof to discharge the accumulated dust, and a lock mechanism for tightly locking the closed lid member.

BACKGROUND OF THE INVENTION

Some of conventional electric vacuum cleaners, especially upright (or vertical type) vacuum cleaners are equipped with a dust collecting case, detachably installed in a suction passage, for accumulating dust in a cylindrical filter fitted in the dust collecting case. The accumulated dust is removed by opening a lid of the dust collection unit. Such dust collection unit is economical as compared with a disposable paper bag in that the unit can be used semipermanently.

An example of this type of vacuum cleaners is disclosed in Japanese Patent Application Early Publication 2000-342492 (A47L 9/10).

In this cleaner, the lid of a dust collecting case is configured to be opened by the weight of the dust itself accumulated in the dust collecting case when a clamp hook locking the lid is unlocked.

This type of dust collection unit is provided with a packing for sealing the periphery of the lid to prevent leakage of dust. In order to enhance the sealing, the sealing pressure of the packing must be raised. However, if the sealing pressure is raised, movement of the lid will become heavy. Furthermore, as the amount of dust accumulated in the dust collecting case increases, the dust will be compacted on the inner wall of the dust collecting case, thereby failing to weigh on the lid. For these reasons, the lid will not always open by itself if the lid is unlocked by releasing the clamp hook, and, in that event, it must be forcibly opened by hand. This work is tedious and unsanitary. Moreover, the conventional apparatuses show an unsanitary phase that they do not have special consideration for the detachment of dust collection unit and discharge of dust in the dust collecting case.

SUMMARY OF THE INVENTION

In view of the problem pertinent to the prior art as mentioned above, the invention is directed to an improved dust collection unit. It is an object of the invention to provide an electric vacuum cleaner equipped with a dust collection unit in which the dust collection unit can be detached and the dust in the dust collecting case can be discharged in a sanitary way, without difficulty and without any manual operation, the invention thereby allowing the user to avoid unsanitary job.

In accordance with an object of the invention above, there is provided an electric vacuum cleaner equipped with a dust collection unit detachably installed in the air suction passage of the cleaner en route from a suction unit to an electric fan thereof, said dust collection unit comprising:

a dust collecting case for accumulating dust sucked in said suction unit;

a hand grip formed on the upper portion of said dust collection unit;

a lid member rotatably engaged with one end of said dust collecting case to serve as the bottom of said dust collecting case;

an outlet for discharging the dust accumulated in said dust collecting case when said lid member is released;

a lock mechanism for sealably locking said lid; and an unlock mechanism for unlocking said lock mechanism; wherein said hand grip facilitating a user to hold said dust collection unit when discharging dust from said outlet, said hand grip arranged to face said user, said hinge arranged at a position which is adjacent to said bottom of said dust collecting case facing said user holding said hand grip, and said lock mechanism arranged near the periphery of said lid member and at a position opposite to said hinge.

In this arrangement, the user can avoid a troublesome and unsanitary job of opening the lid by hand. The lid can be opened without difficulty in a simple procedure. In addition, as the hand grip is arranged to face the user, it can be gripped easily. Moreover, as the lock member is arranged to be released toward the opposite side of the user, it may prevent the dust to be discharged toward the user holding the hand grip, thereby preventing the trouble that the user would be covered with the dust. In such ways, the sanitary can be kept.

In the inventive electric vacuum cleaner, the dust collecting case shall have an inclined upper surface, so that the dust collecting case can be easily attached to and detached from the body of the electric vacuum cleaner.

In addition, the dust collecting case shall be made of a transparent resin and have a cylindrical filter inside the dust collecting case, so that the state of the accumulated dust can be seen and checked visually.

The dust collection unit is provided with a stick for unlocking the lock mechanism, and the stick is arranged outside the dust collecting case and at the position opposite to the hinge. This prevents the trouble that the user would be covered with the dust. The lock member can be opened easily.

The dust collection unit shall be provided with a biasing member for biasing the lid member in the direction in which the lid member is released from the outlet. The biasing member is adapted to forcibly release the lid member from the outlet by a biasing force when the lock mechanism is unlocked by the unlock mechanism. Thereby, even though the lid member is adhered to the dust case, it can be opened easily.

Inside the case, the air and dust taken from a suction port into the dust collecting case are whirled, then only the dust is remained inside. The air filtered free of the dust in the dust collection unit is taken into an electric blower after it is let out of the dust collecting case and discharged out of the body of the vacuum cleaner through an exhaust filter.

DETAILED DESCRIPTION OF THE PREFERRED EMBODIMENT

Figure 1:
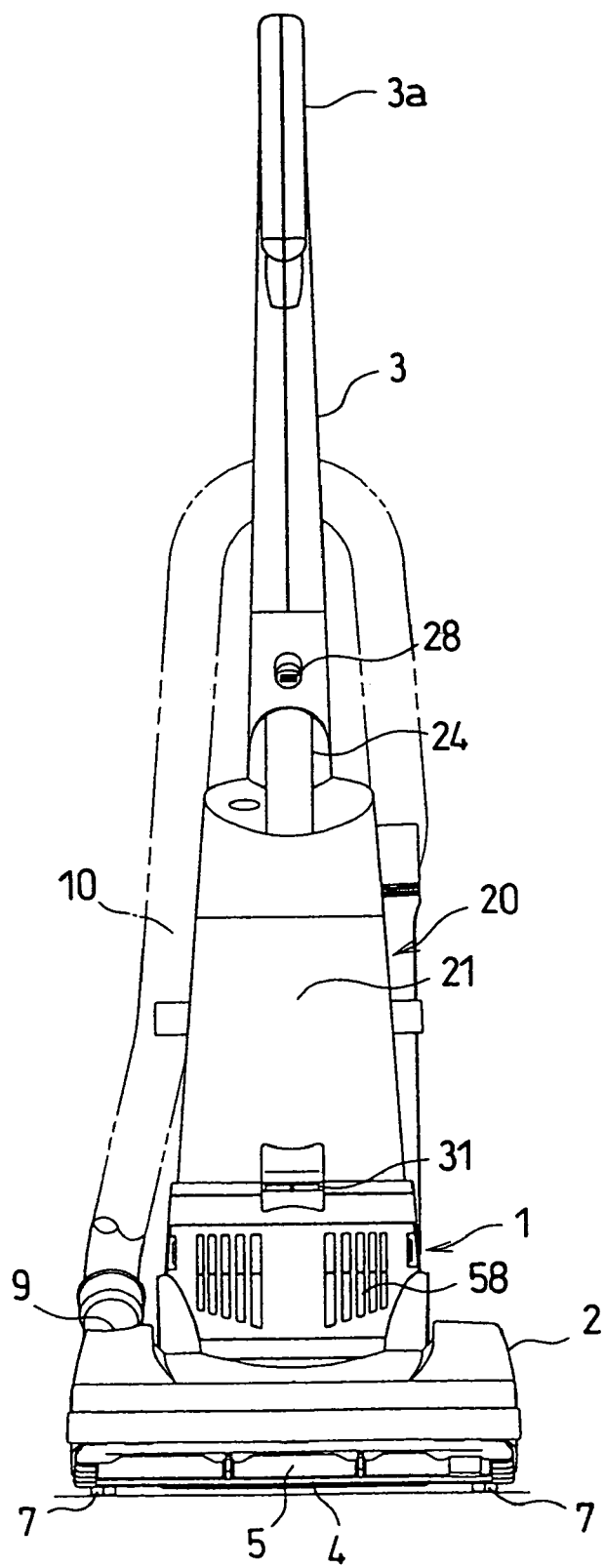
FIG. 1 is a front view of an upright electric vacuum cleaner according to the invention, which is equipped with a detachable dust collection unit mounted in the suction passage en route from a suction unit to an electric fan.
Figure 2:
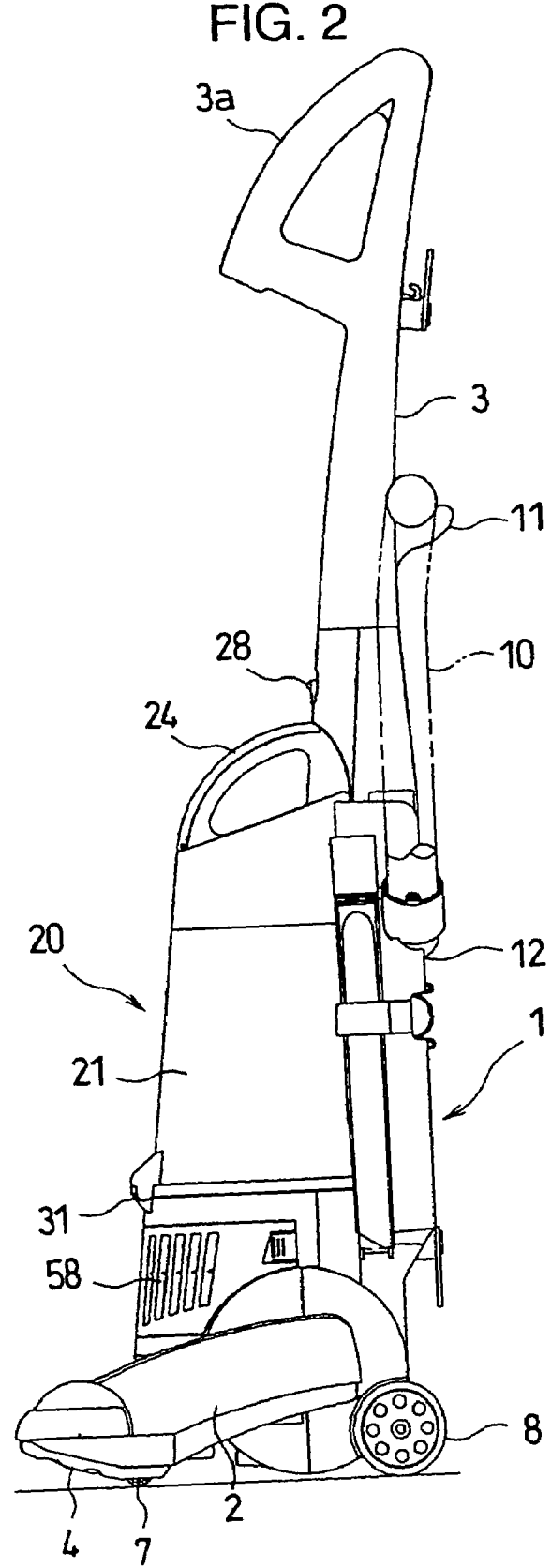
FIG. 2 is a side view of the upright electric vacuum cleaner shown in FIG. 1.

Referring to FIGS. 1-9, a first preferred embodiment of the invention will now be described in detail below. The first embodiment of the invention is an upright electric vacuum cleaner as shown in FIGS. 1 and 2. In this embodiment, the cleaner has a main body 1, a suction unit 2 provided beneath the main body 1 for sweeping a floor, and a manipulation handle 3 provided on top of the main body 1 for maneuvering the main body. The manipulation handle 3 extends upward from the back of the main body 1, and is provided at the top end thereof with a generally triangular grip section 3a, which protrudes forward.

The suction unit 2 has a suction port 4 facing the floor, and a rotary brush 5 facing the suction port 4. The rotary brush 5 is installed in the lower section of the main body 1, and operably connected to the shaft of a built-in electric fan (not shown) by means of a belt for example. Mounted on the opposite sides of the front end of the suction unit 2 are a pair of right and left front wheels 7, and on the rear of the lower end of the main body 1 are a pair of right and left rear wheels 8.

Formed on one side of the back of the suction unit 2 is a hose connector 9 that communicates at the lower end thereof with the suction port 4. One end of a hose 10 is detachably connected to the hose connector 9. The hose 10 extends over the back of the main body 1, via a holder section 11 provided on the back of the manipulation handle 3, to a suction cylinder 12 provided on one side of the back of the main body 1.

On the other hand, a dust collection unit 20 of the invention is detachably mounted on the central front section of the main body 1.

Figure 3:
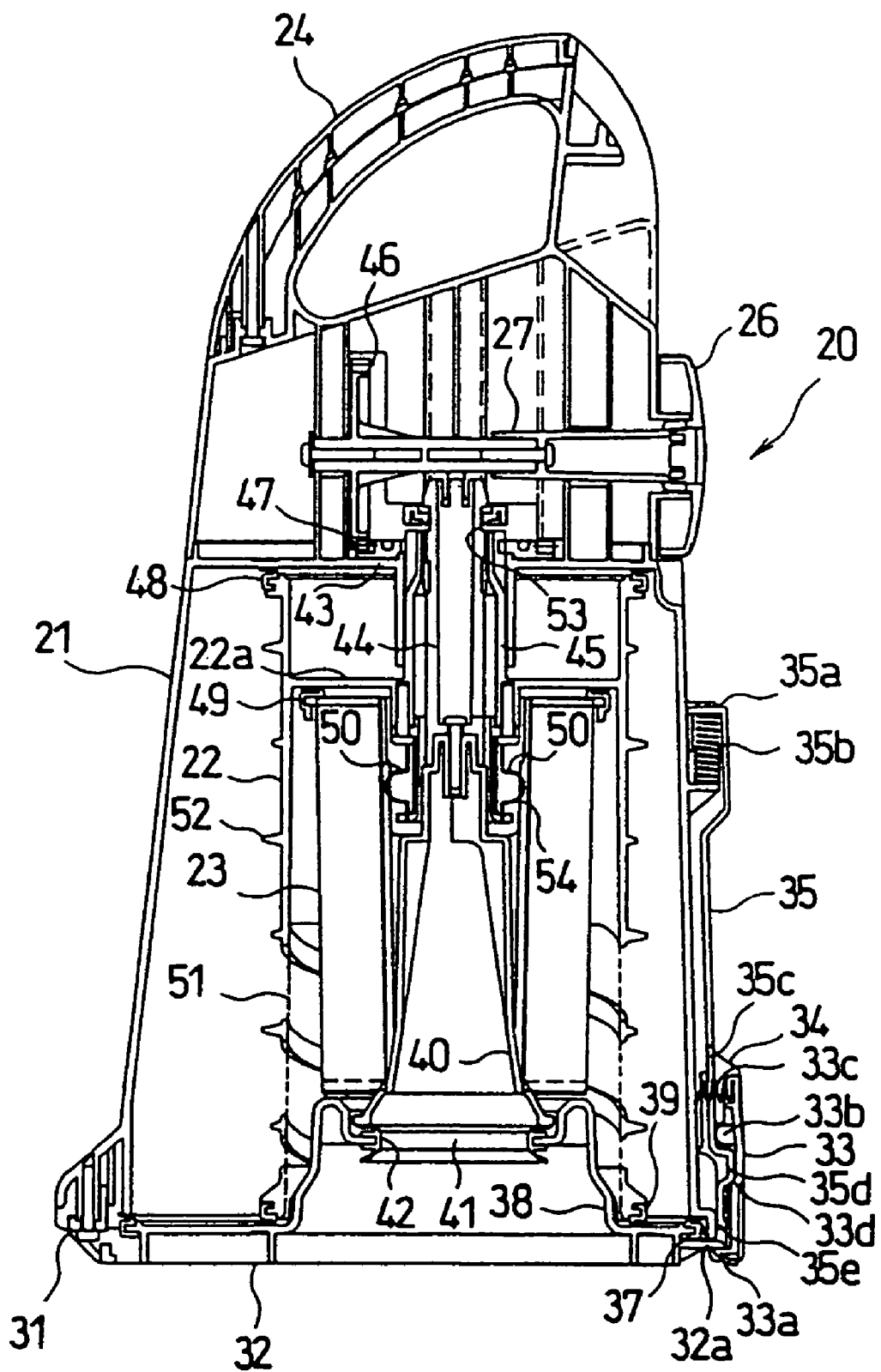
FIG. 3 shows a sectional side elevation of a dust collection unit for use with the upright electric vacuum cleaner of the invention.
Figure 4:
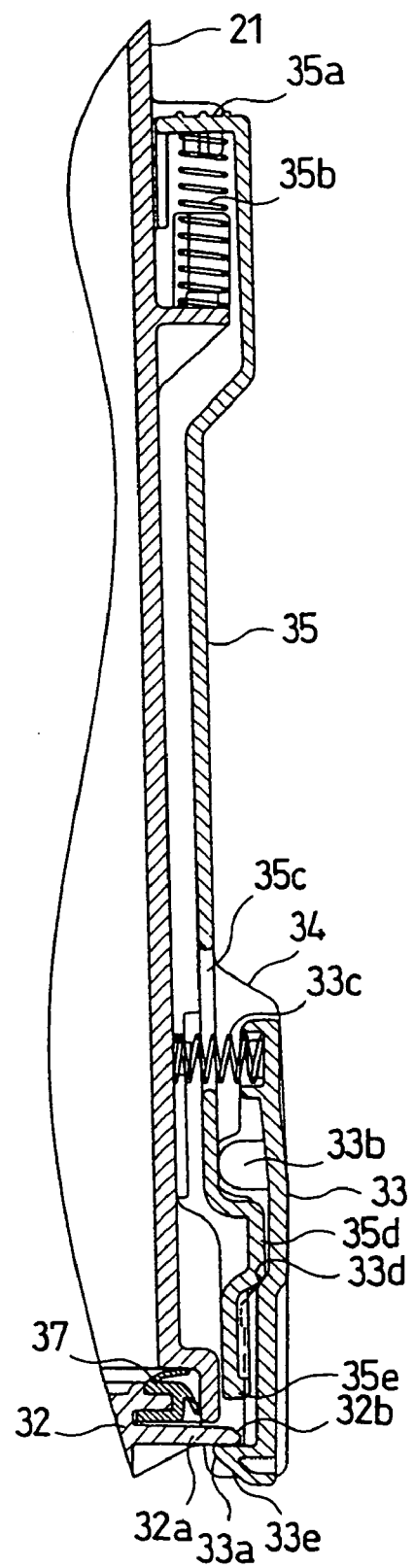
FIG. 4 is an enlarged sectional view of a main part of the lock mechanism and unlocking mechanism for use with the lid member of the dust collection unit shown in FIG. 3.
Figure 5:
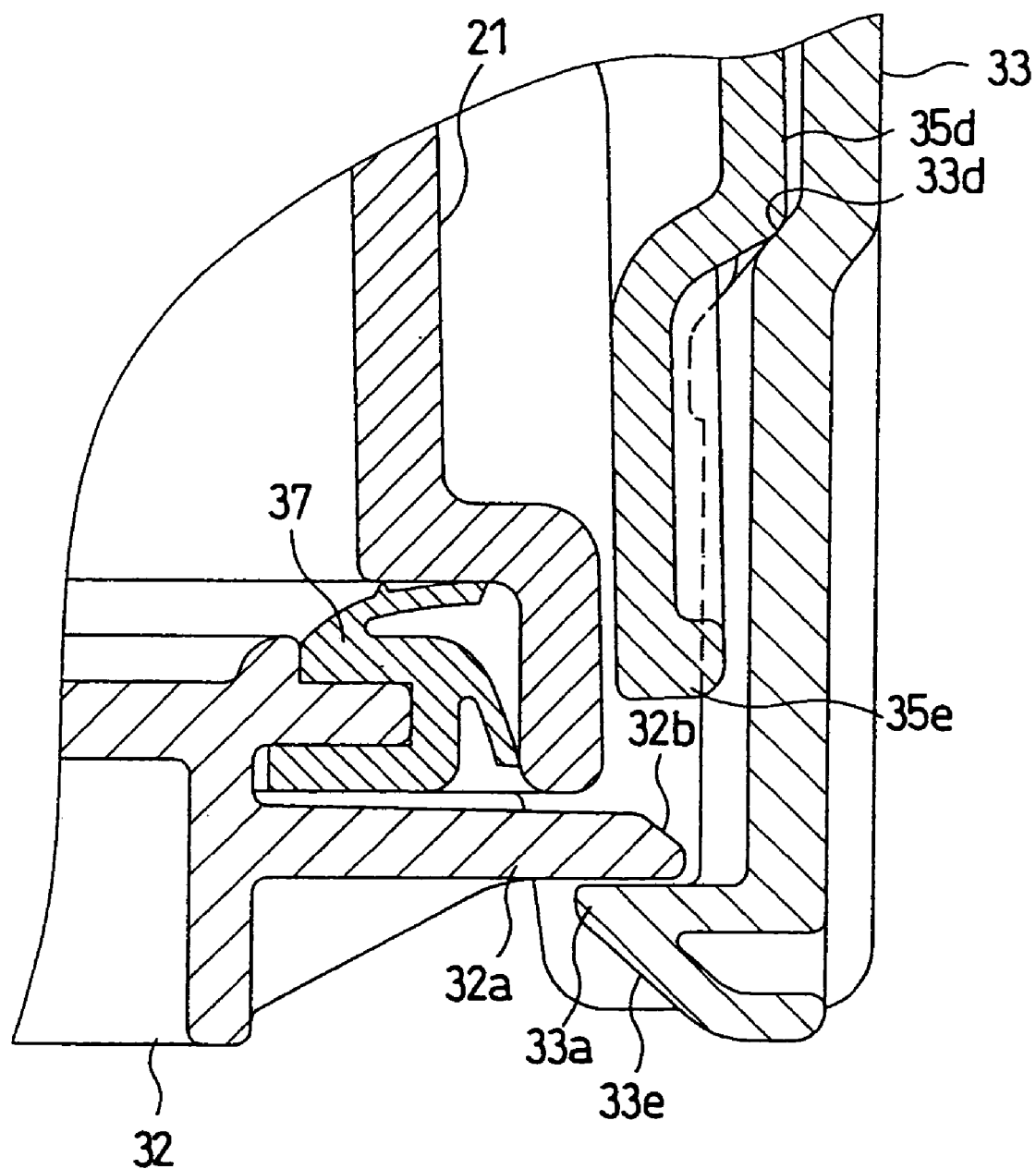
FIG. 5 is an enlarged sectional view of a main part of the lock mechanism and unlock mechanism shown in FIG. 4.

The dust collection unit 20 includes a cylindrical pre-filter 22 installed inside a cylindrical dust collecting case 21 made of a transparent resin, and a generally cylindrical main filter 23 inside the pre-filter 22 as sown in FIG. 3.

The dust collecting case 21 has an upper end which is inclined forward, i.e. facing the user, when the dust collecting case 21 is installed on the main body 1. Formed on the inclined upper end of the dust collecting case 21, and below the manipulation handle 3, is an arcuate hand grip 24 as shown in FIGS. 1 and 2.

On the back of the dust collection unit 20 is a rotary handle 26 for rotating the pre-filter 22. In the example shown herein, the rotary handle 26 has a form of a cap and is hidden and cannot be seen or touched from outside when the unit 20 is mounted on the main body 1 so that the handle 26 cannot be unintentionally operated by children.

The dust collecting case 21 is provided with a suction port (not shown), which, when mounted on the main body 1, communicates to an opening of a suction cylinder 12 via a packing or a seal. The suction cylinder is mounted on the back of the main body 1, offset to one side of the back. (This suction port is shown in the second embodiment by a reference numeral 30.) Because the suction port of the dust collecting case 21 is offset from the center of the dust collecting case 21, dust-containing air sucked from the suction port is set in a whirlpool motion inside the dust collecting case 21.

Rotatably mounted on the bottom of the dust collecting case 21 is a lid member 32 via a hinge 31 (or a fulcrum 31 for opening and closing the lid member). A clamp lever 33 is formed on the lower section of the dust collecting case 21. The closed lid member 32 can be locked by hooking up the clamp hook 33a formed on the lower end of the clamp lever 33 on an extended peripheral portion 32a of the lid member 32.

The clamp lever 33 has a fulcrum 33b which is rotatably mounted on two ribs 34 formed on the opposite sides of the clamp lever 33. Mounted at the upper end of the fulcrum 33b is a coil spring 33c for urging a hook 33a at the lower end of the fulcrum 33b towards the lid member 32.

In the embodiment shown herein, a lid opening stick 35 is slidably mounted between the clamp lever 33 and the dust collecting case 21 so that it can be freely moved in the vertical direction. A coil spring 35b is mounted at an upper manipulatory section 35a of the lid opening stick 35 to urge the lid opening stick 35 upward. The lid opening stick 35 is provided with a vertically elongated hole 35c formed at a position of the coil spring 33c such that the lid opening stick 35 will not abut on the coil spring 33c while moving up and down.

Formed below the fulcrum 33b of the clamp lever 33 is an outward protrusion 35d in correspondence with an inwardly inclined facet 33d formed on the clamp lever 33, so that when the lid opening stick 35 is pushed downward, outward protrusion 35d abuts on the inwardly inclined facet 33d of the clamp lever 33 to push the inclined facet 33d downward, thereby disengaging a clamp hook 33a from the extended portion 32a of the lid member.

Figure 8:
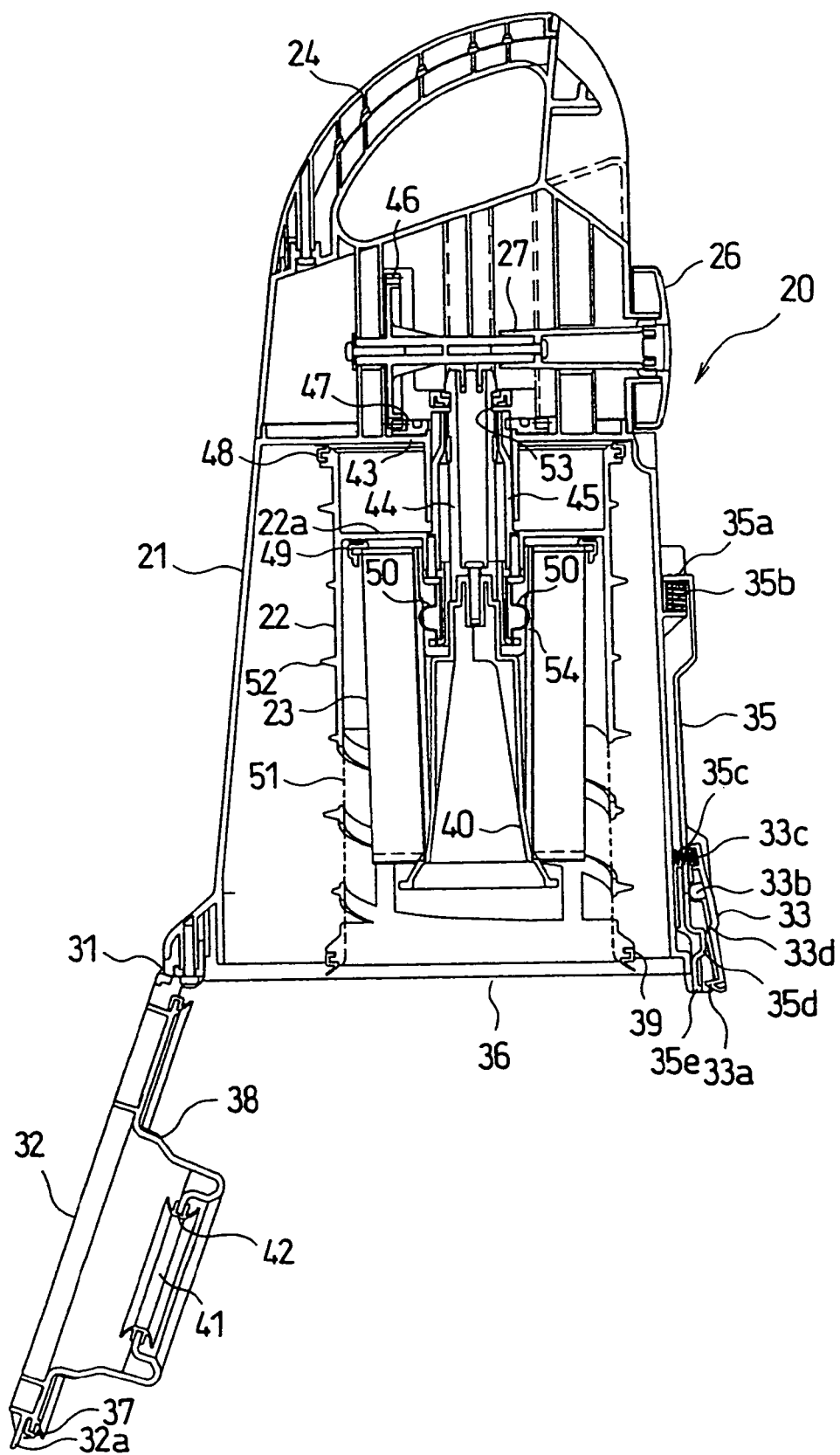
FIG. 8 shows a sectional side elevation of the dust collection unit of FIG. 3 with the lid member of the dust collection unit opened.
Figure 9:
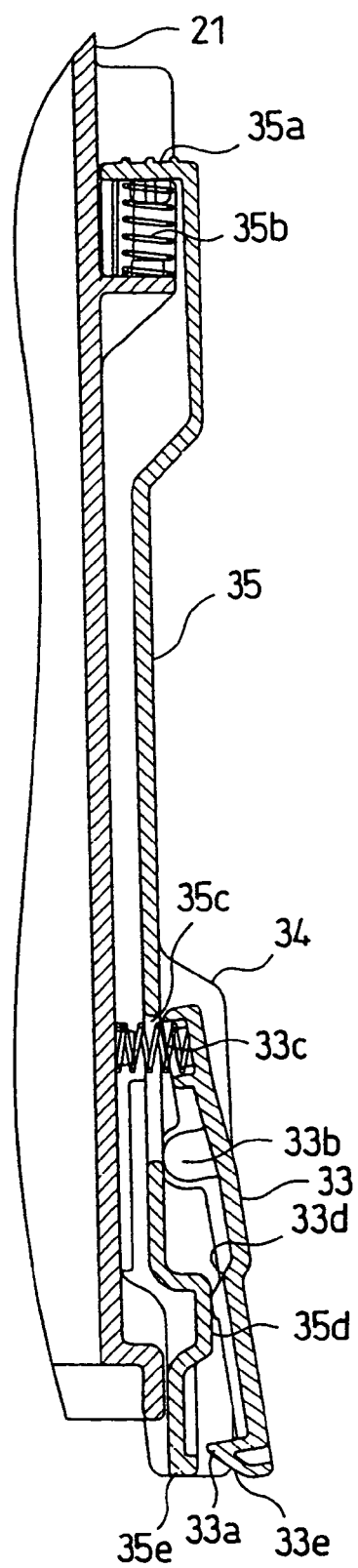
FIG. 9 shows an enlarged sectional side elevation of a main part of the lid member shown in FIG. 8.
Figure 10:
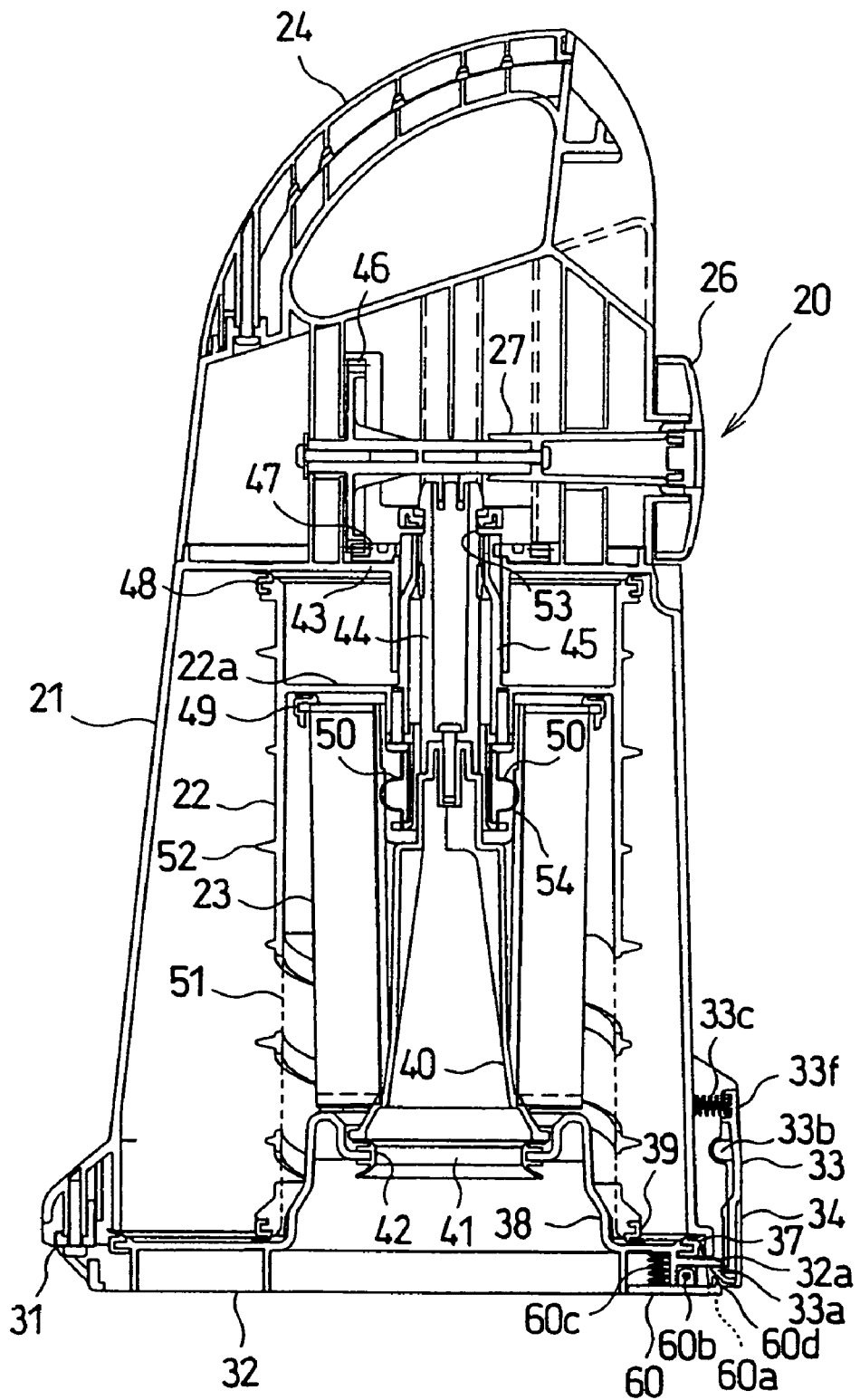
FIG. 10 shows a sectional side elevation of another dust collection unit for use with the upright electric vacuum cleaner of the invention.
Figure 11:
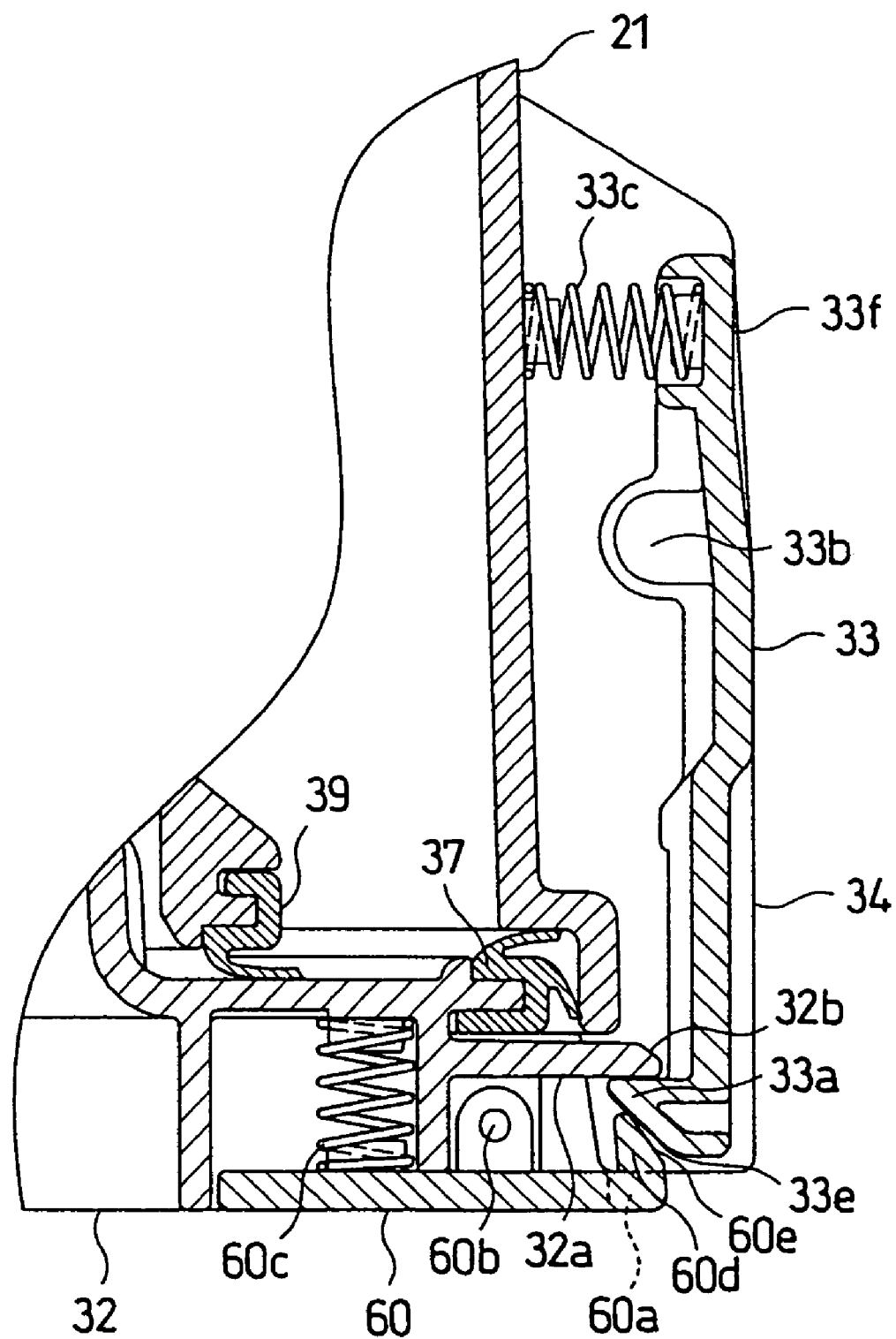
FIG. 11 is an enlarged sectional view of the dust collection unit of FIG. 10, showing in detail a main part of the lock mechanism and unlock mechanism.

The leading end 35e of the lid opening stick 35, when pushed down, abuts on the extended portion 32a of the lid member 32, thereby pushing it down, and forcibly opens the lid member 32 to thereby liberate it from the clamp hook 33a. This causes the dust outlet 36 of the dust collecting case 21 to be opened as shown in FIG. 8. The extended portion 32a of the lid member 32 has an upper inclined facet 32b in correspondence with the inclined facet 33e of the clamp hook 33a so that the lid member 32 can be closed without manipulating the clamp lever 33. When the outward protrusion 35d is pushed down, it is inwardly pushed by the clamp lever 33, the leading end 35e of the lid opening stick 35 pushes down the extended portion 32a without sliding on the inclined facet 32b of the extended portion 32a.

Mounted on the periphery of the lid member 32 is a packing 37 to seal the opening of the dust collecting case 21. Formed on the upper face of the lid member 32 is a protruding section 38 that can fit in the inner periphery of the lower opening of the pre-filter 22 so as to prevent transverse vibrations of the pre-filter 22. A packing 39 is provided on the open end of the pre-filter 22 for keeping the open end of the pre-filter 22 in tight contact with the upper surface of the lid member 32.

A suction port 41 is formed inside the top end of the protruding section 38 of the lid member 32. The suction port 41 is connected to the lower end of a cylindrical member 40, which forms an air passage for directing air from the main filter 23 to the exterior of the dust collecting case 21. A packing 42 is mounted on the inner periphery of the suction port 41 to keep the open end of suction port 41 and the cylindrical member 40 of the main filter 23 in sealing contact.

The main filter 23 is mounted on the top plate 43 of the dust collecting case 21 by means of a mounting shaft 44 that protrudes from the center of the main filter 23. A cylindrical hollow shaft 45 of the pre-filter 22 is mounted on the mounting shaft 44, extending between the top plate 43 of the dust collecting case 21 and the main filter 23.

Mounted on the upper end of the cylindrical hollow shaft 45 of the pre-filter 22 is an annular gear 47 that engages with an disk-shaped gear 46 mounted on the rotary shaft 27 of the rotary handle 26. Thus, rotation of the pre-filter 22 will cause the rotation of the rotary handle 26 in a predetermined direction. By forming a simple mechanism for rotating the pre-filter (the mechanism hereinafter referred to as pre-filter rotating mechanism) in this way, the pre-filter 22 can be firmly rotated. Mounted on the outer peripheries of the upper ends of the pre-filter 22 and the main filter 23 are packings 48 and 49, respectively, to keep the pre-filter 22 in tight contact with an upper partition plate 22a and the main filter 23 in tight contact with the top plate 43 of the dust collecting case 21, so as to prevent dust from entering the pre-filter rotating mechanism described above.

Resilient protrusions 50 are formed under the cylindrical hollow shaft 45 of the pre-filter 22. The resilient protrusions 50 abut on the plait tips formed on the inside of the main filter 23 as described later. With this arrangement, the resilient protrusions 50 are rotated together with the cylindrical hollow shaft 45 to prick the plait tips of the main filter 23, facilitating efficient removal of dust from the filter.

The lower section 51 of the pre-filter 22 is meshed for filtering larger pieces of dust. Because the meshed filter 51 is provided in the lower section of the dust collecting case 21, dust sucked in together with the air from a suction port (not shown) provided at an upper section of the dust collecting case 21 is forced to whirl downward at a high speed, and compacted on the bottom of the dust collecting case 21.

Formed on the external circumference of the pre-filter 22 are spiral ribs 52 that generally extend in the vertical direction. The ribs 52 are configured to push the dust accumulated and compacted in the dust collecting case 21 towards the dust outlet 36 of the lid member 32 when the rotary handle 26 is turned in the clockwise direction.

The main filter 23 is a plaited cylindrical paper filter surrounding the cylindrical member 40 serving as an air passage for the filtered air. The mounting shaft 44 fixed on the upper central section of the main filter 23 is fitted in a mounting bore 53 formed in the top plate 43 of the dust collecting case 21 in such a way that the mounting shaft 44 will not be rotated with the rotary pre-filter 22.

The tips of the plait inside the main filter 23 are covered with a plastic resin member 54 to prevent them from being worn by the friction with the rotating resilient protrusions 50 formed on the lower section of the cylindrical hollow shaft 45 of the pre-filter 22.

The clean air filtered by the dust collection unit 20 is discharged from the suction port 41 (of the dust collecting case 21) located below the cylindrical member 40 of the main filter 23. The air is then sucked into an electric fan (not shown), and exhausted, via an exhaust filter (not shown), from an outlet 58 formed in the lower front end of the main body 1.

In the upright vacuum cleaner of the invention as described above, dust on the floor is scratched by the rotary brush 5 of the suction unit 2 and enters the dust collecting case 21 through the hose 10 and the suction cylinder 12 positioned offset from the center of back of the main body 1. The dust is whirled downward along the inner wall of the dust collecting case 21. Larger pieces of dust accumulate on the bottom of the dust collecting case 21.

Since the mesh 51 of the pre-filter 22 is located in the lower section of the dust collecting case 21, dust sucked together with the air from the upper suction port is forcibly whirled downward, causing the dust to be accumulated and compacted on the bottom of the lid member 32 of the dust collecting case 21, as previously described. This compaction effect is significant especially when dust is cotton refuse. The compression rate is larger several fold, as compared with a conventional cyclone type separator. Because of such large compaction rate, the dust collection unit of the invention is capable of collecting a large amount of dust per unit volume.

On the other hand, fine dust enters inside the pre-filter 22 via the mesh 51 provided below the pre-filter 22, and is filtered by the plaited main filter 23. As a consequence, only clean filtered air is passed down to the electric fan and exhausted from the outlet 58.

As described above, in the dust collection unit 20 of the invention, the cylindrical pre-filter 22 is provided with resilient protrusions 50 formed at the lower end of the cylindrical hollow shaft 45 so as to prick the tips of the plait inside the main filter 23. In addition, spiral ribs 52 are provided on the exterior of the pre-filter 22. The cylindrical hollow shaft 45 of the pre-filter 22 is operably connected to the rotary handle 26 via the gears 46 and 47.

Consequently, when the rotary handle 26 is rotated in one (arbitrary) direction, the pre-filter 22 is rotated in a corresponding direction by means of the gears 46 and 47 and the cylindrical hollow shaft 45. As the pre-filter 22 is rotated, the resilient protrusions 50 located on the lower section of the shaft 45 prick the tips of the plait (resin member 54) inside the main filter 23, causing vibrations therein, which in turn causes fine dust accumulating on the surface of the main filter 23 to fall off. Large-sized pieces accumulating in a compacted form in the dust collecting case 21 sweep fine dust which is sticking to the outer surface of the pre-filter 22. Accordingly, lowering of dust collecting efficiency of the dust collection unit caused by accumulation of dust on the main filter 23 and pre-filter 22 may be effectively prevented.

As the large-sized dust pieces or trash accumulates in the dust collecting case 21, the mesh 51 formed below the pre-filter 22 can be gradually clogged. In the event that clogging has taken place, the dust collection unit 20 is once disengaged from the vacuum cleaner, and by rotating the rotary handle 26, and hence the pre-filter 22, to move the spiral ribs 52 formed thereon up and down, gaps (air passage) can be formed between the mesh 51 and the trash, that prevents lowering of dust collection efficiency of the filter.

On the other hand, to remove the dust accumulated in the dust collecting case 21, the hand grip 24 of the dust collecting case 21 is withdrawn by hand while pressing the button 28 provided on the hand grip 24. This permits the dust collecting case 21 to be disconnected from the main body 1. At this time, the dust collecting case 21 can be detached from the body of the vacuum cleaner very easily, as the hand grip 24 is arranged to face the user.

Figure 6:
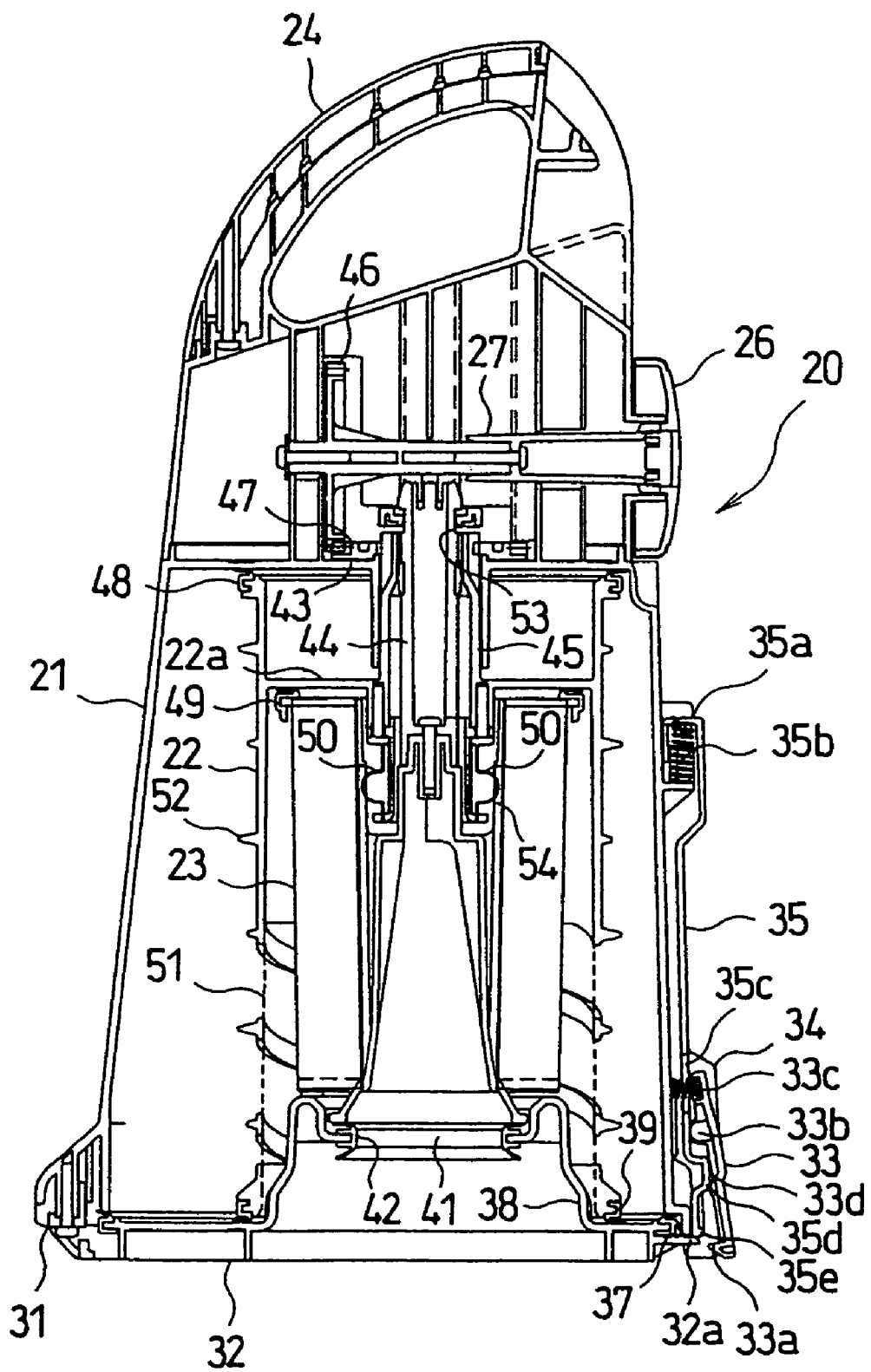
FIG. 6 shows a sectional side elevation of the clamp hook of the dust collecting case of the dust collection unit shown in FIG. 3, showing a condition that the clamp hook is unhooked.
Figure 7:
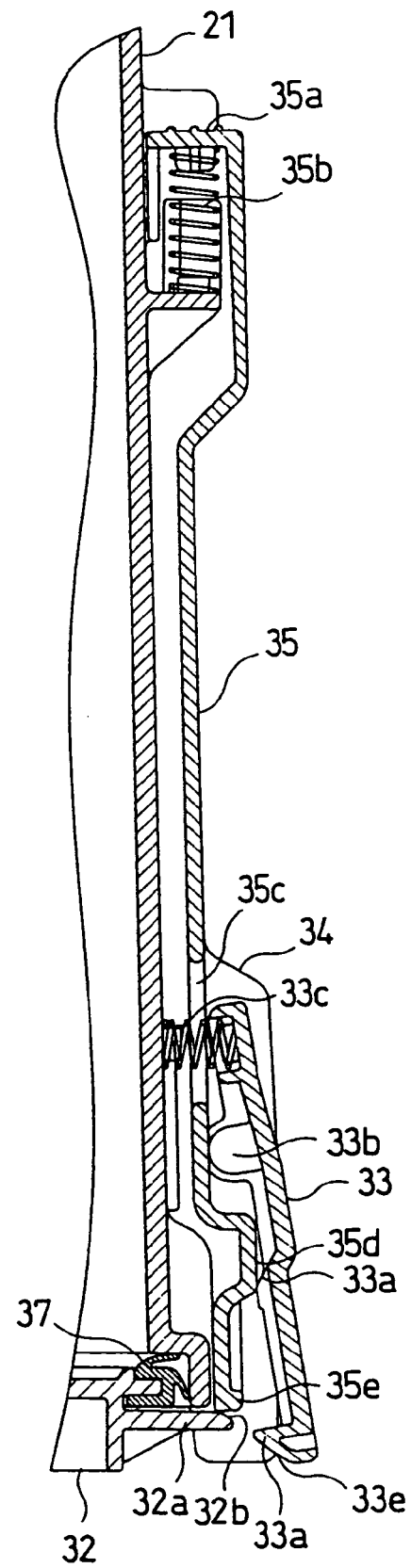
FIG. 7 shows an enlarged sectional view of a main part of the lock mechanism shown in FIG. 6.

If the manipulatory section 35a of the lid opening stick 35 is forced down as shown in FIGS. 6 and 7, the outward protrusion 35d formed on the lower end of the lid opening stick 35 abuts against the inwardly inclined facet 33d of the clamp lever 33, causing the inwardly inclined facet 33d to recede outward, thereby rotating the clamp lever 33 away from the extended portion 32a of the lid member 32 and disconnecting the clamp hook 33a of the clamp lever 33 from the extended portion 32a. If the manipulatory section 35a is further forced down, the leading end 35e of the stick 35 abuts on the extended portion 32a and pushes it down, causing the lid member 32 to be forcibly opened as shown in FIG. 8. Now, the dust accumulated in the dust collecting case 21 can be removed from the dust collecting case 21.

Thus, if the sealing pressure of the packing 37 is increased to enhance sealability of the lid member 32 or if the compacted dust in the dust collecting case 21 sticks to the inner wall of the dust collecting case 21, not weighing on the lid member 32, the lid member 32 can be easily and securely opened without manually opening it by hand, thereby permitting the user to avoid laborious and unsanitary operations of opening the lid member 32.

It is noted that although the lid member 32 can be easily opened, cotton refuse in particular does not come off the inner wall of the dust collecting case 21 when it is compacted on the wall. In this case, the spiral ribs 52 provided on the exterior of the pre-filter 22 may be operated to push the compacted dust such as cotton refuse outward. This facilitates easier removal of the sticking dust. This can be done by turning the rotary handle 26 to rotate the pre-filter 22 in a predetermined direction (right in the example shown).

Since the hinge 31 of the lid member 32 (or fulcrum for opening the lid member) is provided on the same side as the hand grip 24 of the dust collecting case 21, the lid member 32 can prevent removed dust from coming unexpectedly close to the user or splashing to the user when the hand grip 24 is held and the lid member 32 is opened (FIG. 8).

Every time dust is removed, dust cleaning function of the pre-filter is executed by the rotation of the pre-filter 22, so that lowering of dust collecting efficiency of the filter is prevented if the user is not cognizant of cleaning the filter.

As described above, a vacuum cleaner in accordance with the embodiment described above provides an economic advantage that, unlike conventional cleaners, it can be used semipermanently without any replacement of disposable paper bag. In addition, the usability of the dust collection unit is greatly improved to that of a disposable type unit or more than that.

The upright dust collection unit 20 may have a sufficient inner volume that it is especially suitable for a heavy duty upright vacuum cleaner.

An upright vacuum cleaner of the invention is provided with a generally triangular protruding grip 3a formed on top of the manipulation handle 3 that extends upward from the back of the main body 1, as shown in FIG. 3. Hence, the grip section 3a provides the user with convenience that he needs not to stoop over the cleaner while cleaning, for example, the floor under a bed if he inclines the cleaner through a large angle, since he can then keep the grip section 3a at a convenient height.

FIGS. 10-19 show further embodiments of the invention, in which the same reference numerals refer to the same components as before. The main body 1 is the same as the preceding one shown in FIGS. 2 and 3. The dust collecting case 21 is provided in the back thereof with a suction port 30 offset to one side of the back as shown in rear views of FIGS. 12, 16, and 18. The suction port 30 communicates to the suction cylinder 12 of the main body 1 when they are air-tightly connected together.

A unique feature of this embodiment is that the lid member 32 has a special opening mechanism. The rest of the features of the embodiment are the same as those of the preceding ones.

As compared with the preceding lid opening mechanism in which the lid opening stick 35 is formed on the dust collecting case 21, this lid opening lever 60 is provided on the lid member 32.

The lock mechanism has a clamp lever 33 attached to one side of the dust collecting case 21 opposite the hinge 31 of the lid member 32 (or fulcrum for opening the lid member), and having a hook 33a to be hooked on the extended portion 32a formed on the fringe of the lid member 32, like a preceding embodiment. However, the lid opening mechanism is provided with a lid opening lever 60 which is mounted on the underside of the lid member 32 in correspondence with the clamp lever 33, opposite the hinge 31, and is urged to push the underside of the dust collecting case 21.

Figure 12:
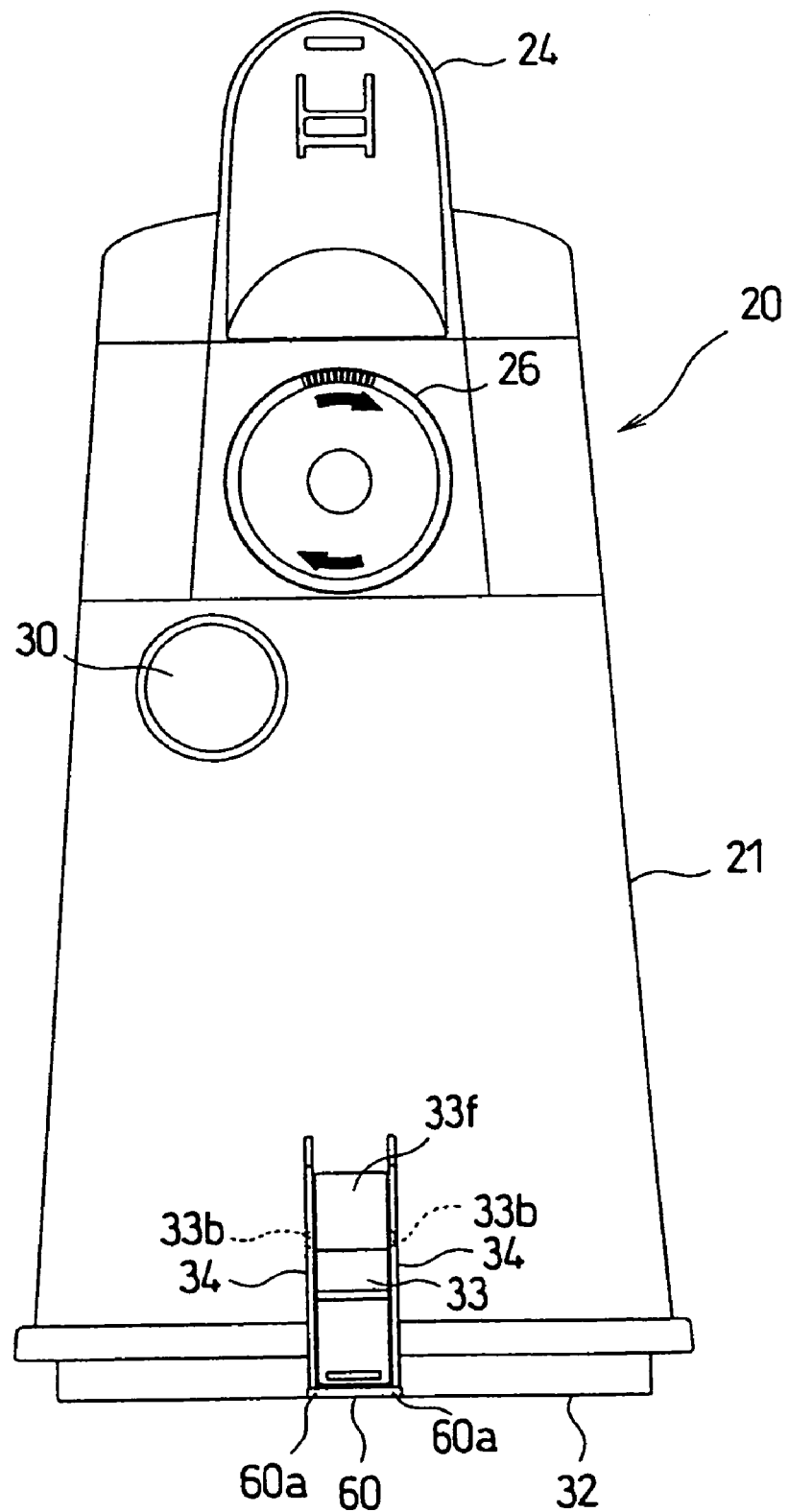
FIG. 12 is a rear view of the dust collection unit shown in FIG. 10.
Figure 13:
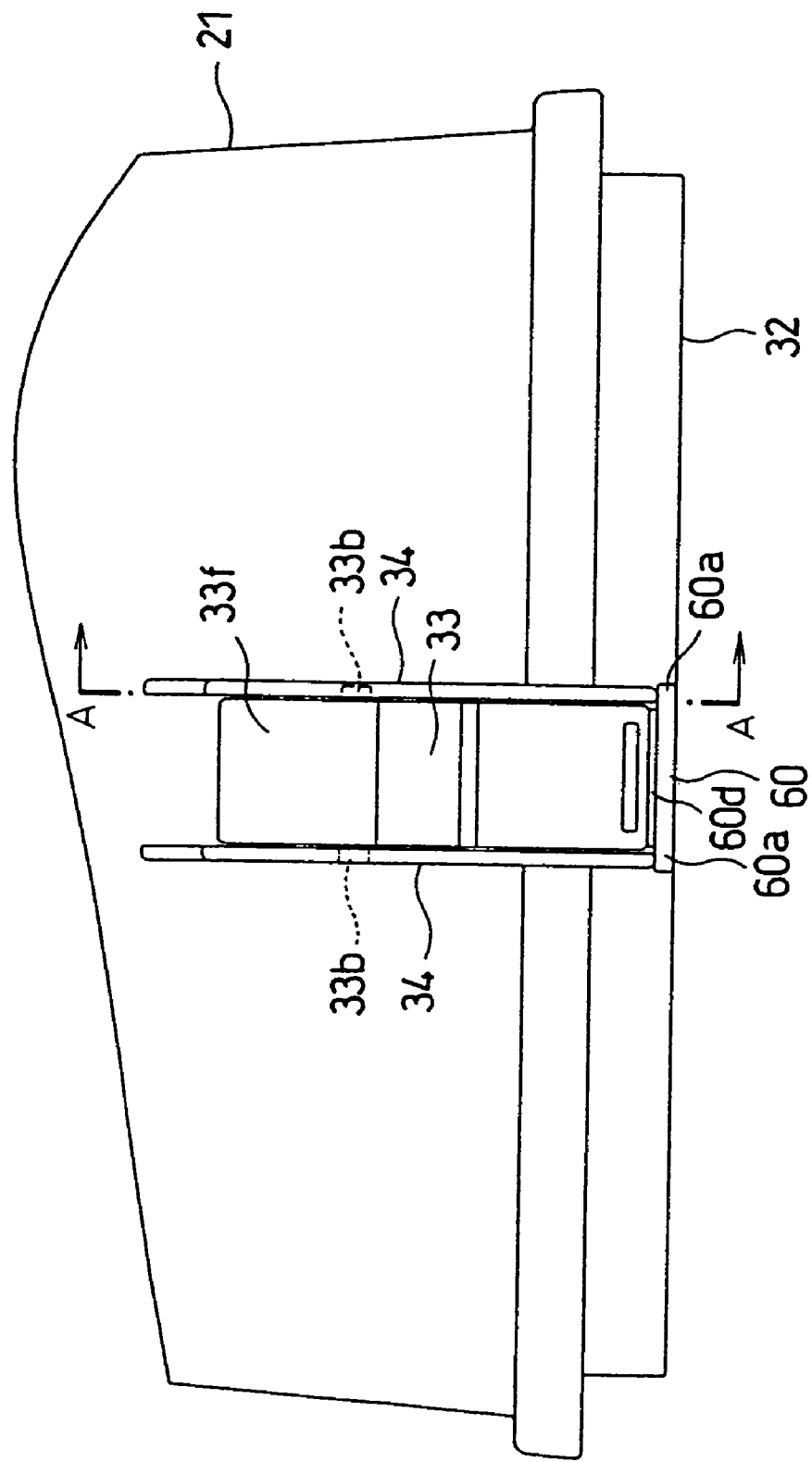
FIG. 13 is an enlarged rear view of a main part of the dust collection unit shown in FIG. 12.
Figure 14:
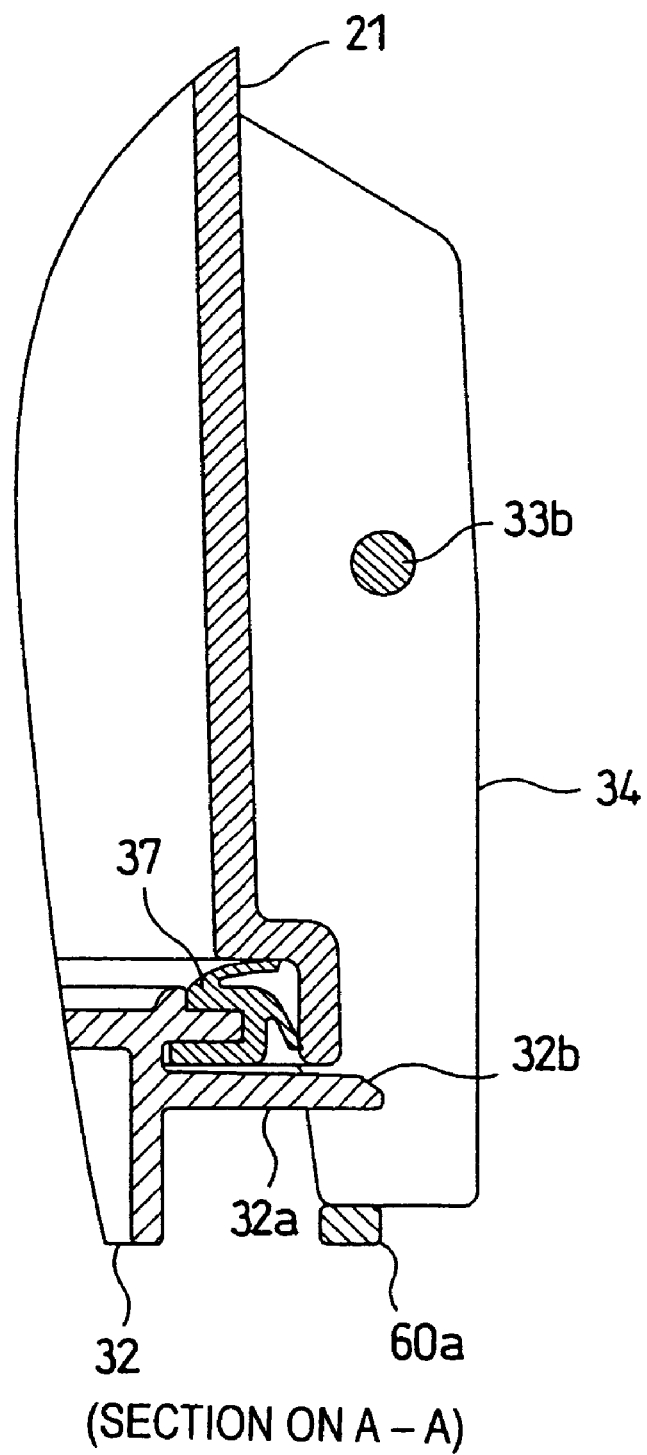
FIG. 14 shows a cross section taken along line A-A of FIG. 13.

The lid opening lever 60 is provided at one end thereof with pushing sections 60a that protrude from the opposite sides of said one end to push the lower ends of the ribs 34 supporting the fulcrum 33b of the clamp lever 33, as shown in FIGS. 12-14. The lid opening lever 60 is urged by a coil spring 60c mounted on the other end of the fulcrum 60b of the lever 60 so as to push the lower ends of the ribs 34 against the upper pushing sections 60a.

In addition, the lid opening lever 60 is provided at the tip thereof with a protrusion 60d located between the two ribs 34. The facet 60e of the protrusion 60d facing an inclined facet 33e of the clamp hook 33a is correspondingly inclined so as not to hinder locking operation of the clamp hook 33a, as shown enlarged in FIG. 11.

Figure 15:
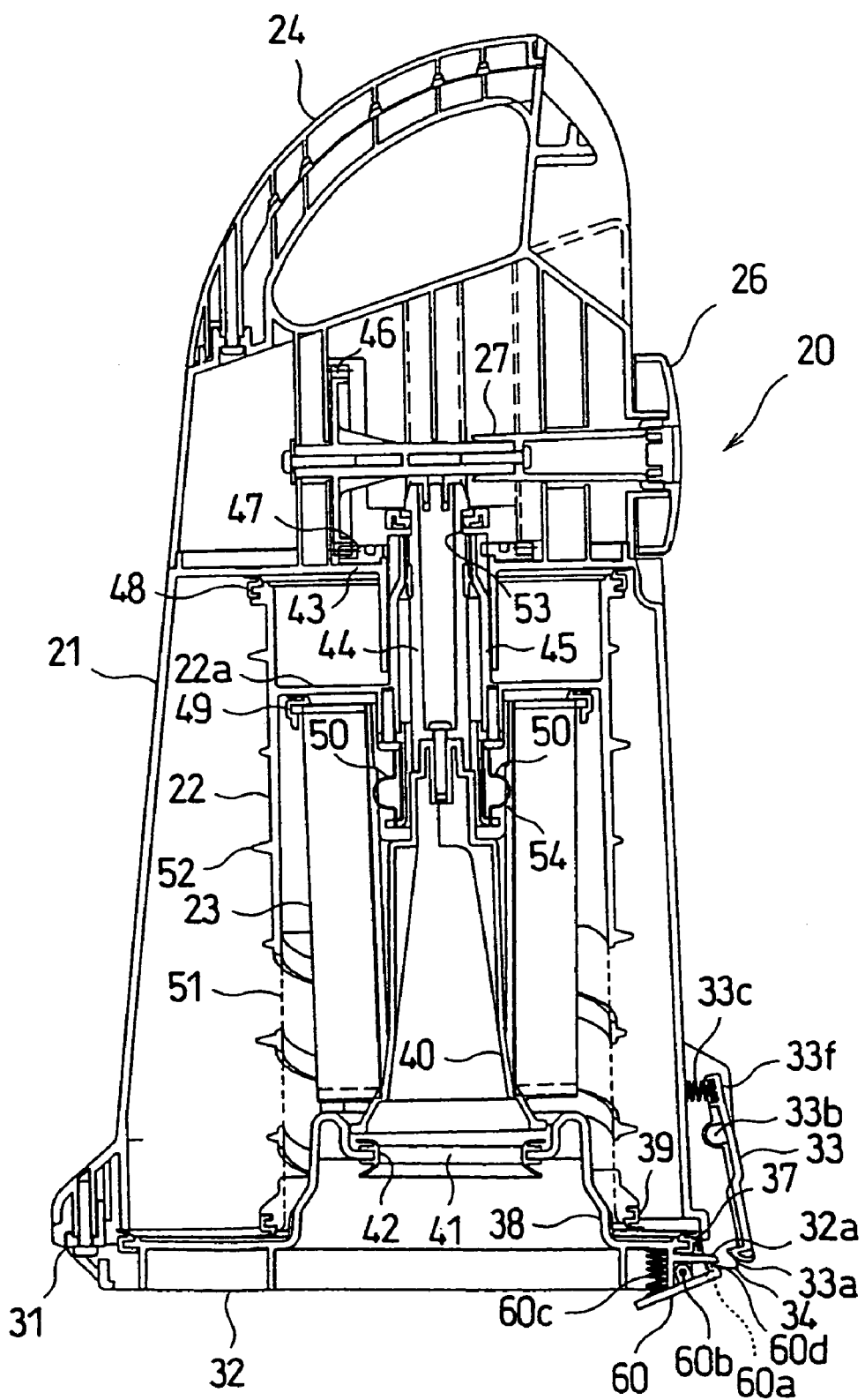
FIG. 15 shows a sectional side elevation of the dust collection unit of FIG. 10 when the clamp hook is disengaged and the lid opening lever starts opening the lid member.
Figure 16:
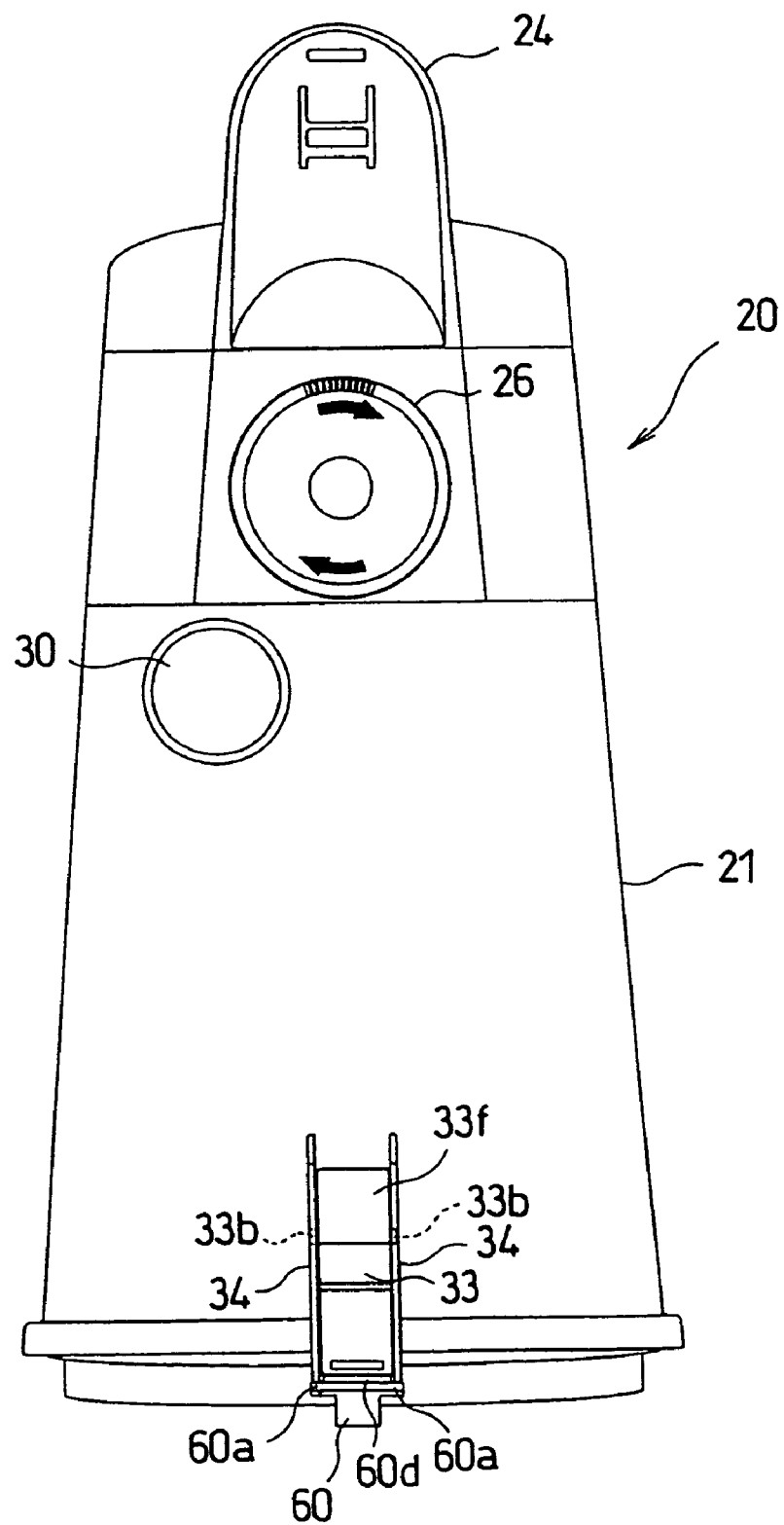
FIG. 16 is a rear view of the dust collection unit in the same condition as shown in FIG. 15.
Figure 17:
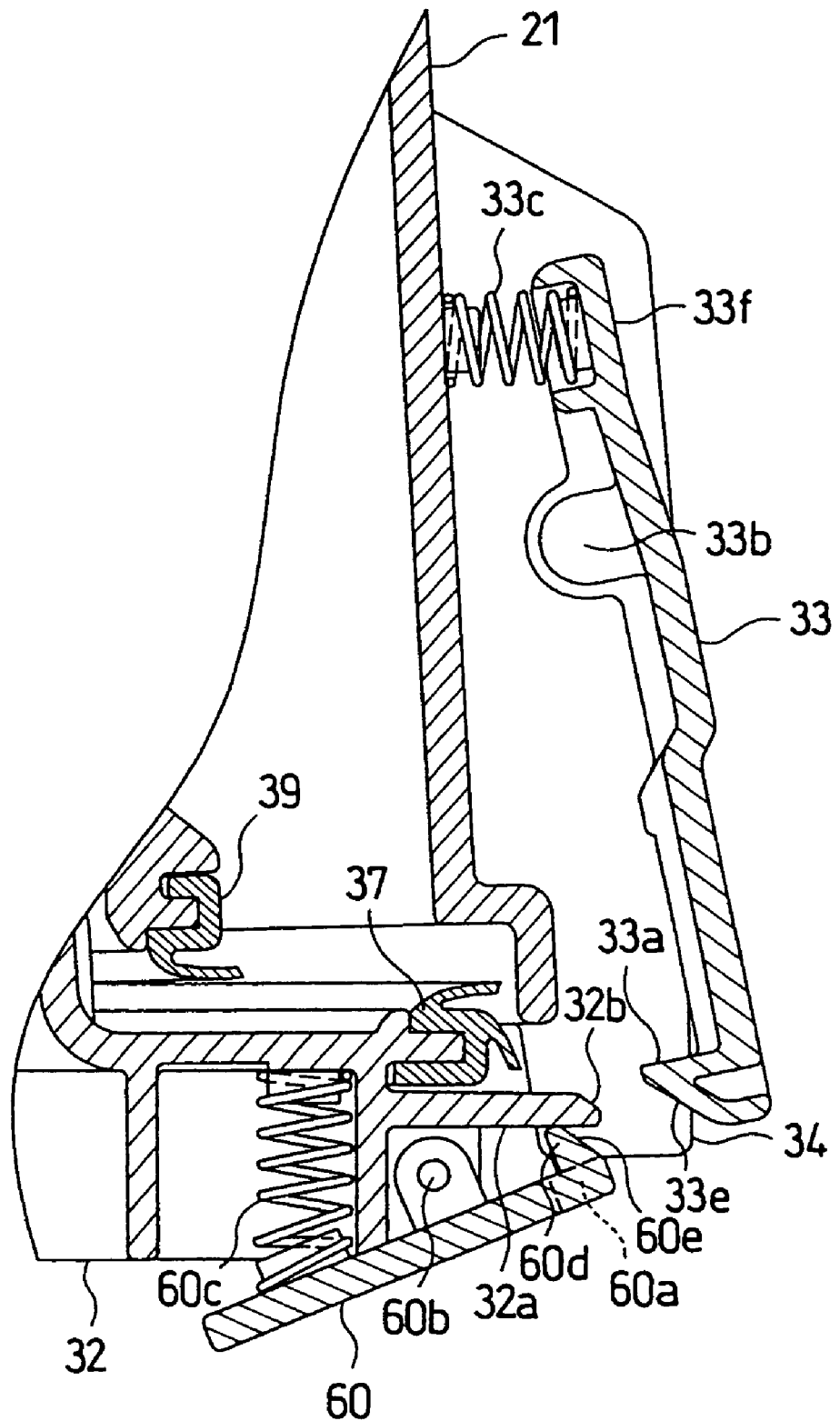
FIG. 17 is an enlarged sectional view of a main part of the dust collection unit shown in FIG. 15.

In the arrangement described above, in order to discharge the accumulated dust from the dust collecting case 21, the upper section 33f of the clamp lever 33 is pushed to disengage the clamp hook 33a at the lower end thereof from the extended portion 32a of the lid member 32 as shown in FIGS. 15-17.

Figure 18:
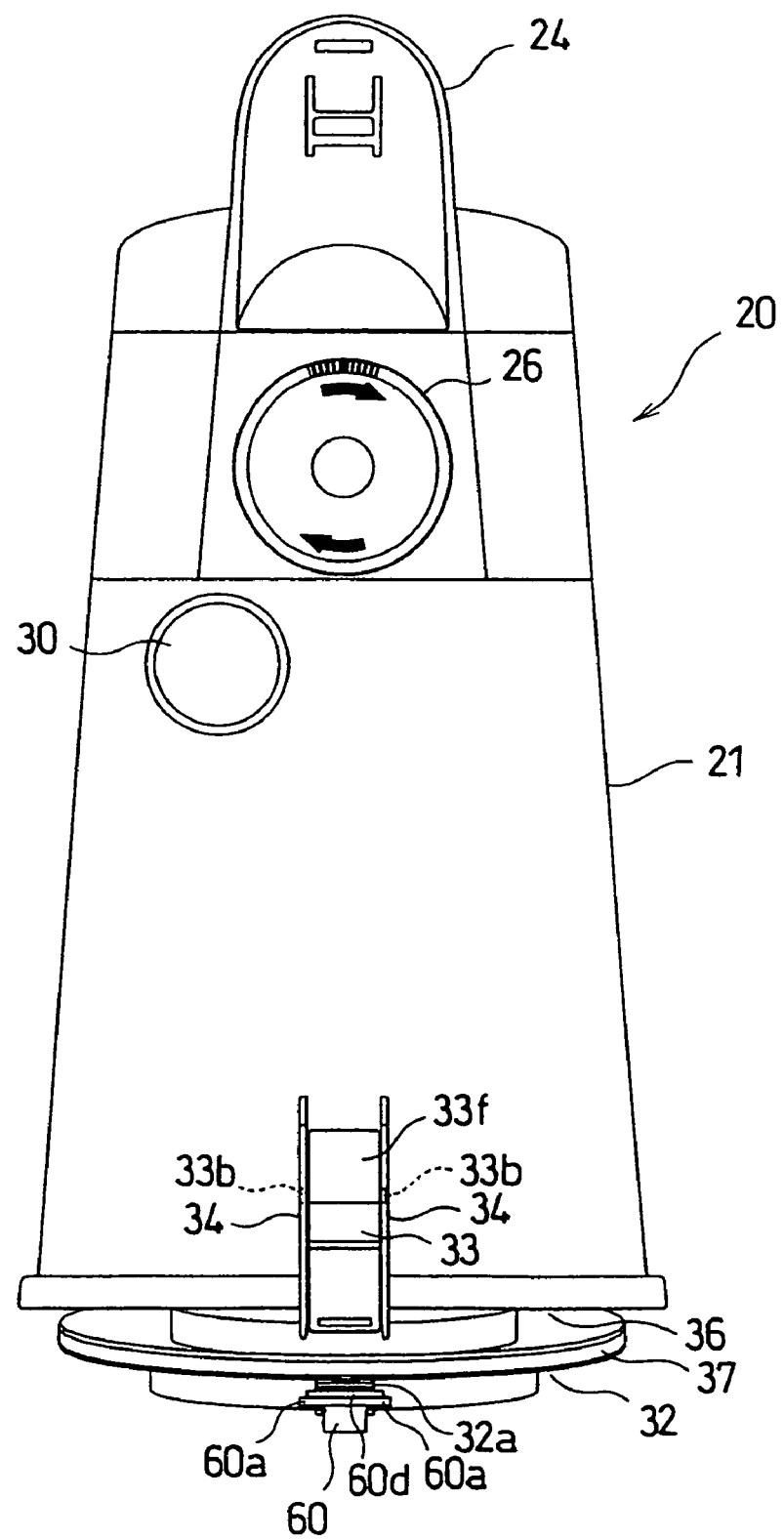
FIG. 18 shows a rear view of the dust collection unit of FIG. 15, with the lid member further opened.
Figure 19:
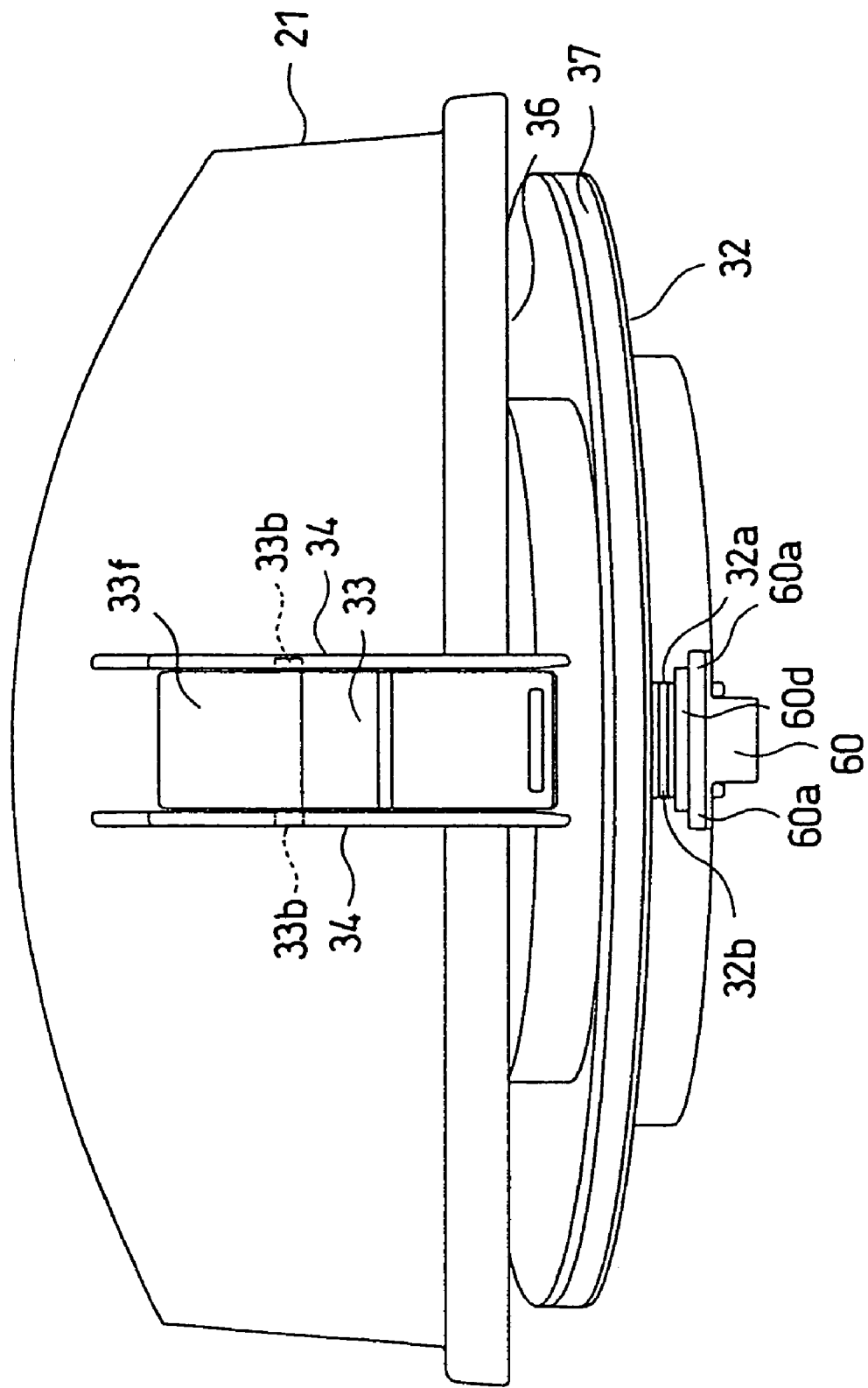
FIG. 19 shows an enlarged rear view of the dust collection unit shown in FIG. 18, showing in detail the main part of the dust collection unit.

When the lid member 32 is unlocked from the clamp hook 33a, a downward force acts on the lid member 32 as a consequence of the reaction of pushing the undersides of the ribs 34 of the dust collecting case 21 by the pushing section 60a of the lid opening lever 60. The downward force will cause the lid member 32 to be opened to the position as shown in FIGS. 15-17. As the lid member 32 is opened like this, the packing 37 is also disengaged from the open end of the dust collecting case 21, allowing the lid member 32 to open by the weight of its own as shown in FIGS. 18-19. The dust accumulated in the dust collecting case 21 is thus discharged from the case 21.

In this way, as in the preceding embodiments, manual operations of the lid member 32 are not necessary to open the lid member if the weight of the compacted dust does not facilitate the disengagement of the lid member due to the fact that the dust is compacted in the dust collecting case 21 and sticks to the inner wall of the case 21. Thus, the user can avoid unsanitary job of opening the lid member 32 to remove the dust by hand.

In this embodiment, the two ribs 34 supporting the shaft 33b of the clamp lever 33 are utilized advantageously to create a reaction force to disengage the lid member from the dust collecting case, and no additional element is required on the dust collecting case 21 for liberating the lid member. Thus, the dust collection unit can be manufactured at no extra cost. The unit can be operated like a conventional one.

The protrusion 60d formed between the two ribs 34 facilitates correct positioning of the lid member 32 following the removal of dust.

The invention claimed is:

1. A dust collection unit for use with an electric vacuum cleaner having: a dust collecting case for accumulating dust sucked via a suction unit; a hand grip formed on the upper portion of said dust collection unit; a lid member pivotally mounted near the bottom of said dust collecting case by at least one hinge; an outlet for discharging the dust accumulated in said dust collecting case when said lid member is released; a lock mechanism for locking said lid member in a closed condition; and an unlock mechanism for unlocking said lock mechanism, said hand grip facilitating a user to hold said dust collection unit when discharging dust from said outlet, said hand grip arranged to face said user, said hinge arranged at a position which is adjacent to said bottom of said dust collecting case facing said user holding said hand grip, and said lock mechanism arranged near the periphery of said lid member and at a position opposite to said hinge.

2. The dust collection unit for use with an electric vacuum cleaner in accordance with claim 1, wherein said dust collecting case has an inclined upper surface.

3. The dust collection unit for use with an electric vacuum cleaner in accordance with claim 1, wherein said dust collecting case is made of a transparent resin and has a cylindrical filter inside said dust collecting case.

4. An upright electric vacuum cleaner having: a suction unit mounted on the lower section of the body of said upright electric vacuum cleaner, a manipulation handle for manipulating the body of said vacuum cleaner that is provided above the body of said vacuum cleaner; and a dust collection unit detachably mounted on the body of said vacuum cleaner, said dust collection unit including:

a dust collecting case for accumulating dust sucked via said suction unit;

a hand grip formed on the upper portion of said dust collection unit;

a lid member pivotally mounted near the bottom of said dust collecting case by at least one hinge;

an outlet for discharging the dust accumulated in said dust collecting case when said lid member is released;

a lock mechanism for locking said lid member in a closed condition; and an unlock mechanism for unlocking said lock mechanism, said hand grip facilitating a user to hold said dust collection unit when discharging dust from said outlet, said hand grip arranged to face said user;

said hinge, arranged at a position which is adjacent to said bottom of said dust collecting case facing said user holding said hand grip, and said lock mechanism arranged near the periphery of said lid member and at a position opposite to said hinge.

5. The upright electric vacuum cleaner in accordance with claim 4, wherein said hand grip is located at a lower forward position of said manipulation handle when said dust collection unit is mounted on the body of said vacuum cleaner.

6. The upright electric vacuum cleaner in accordance with claim 4, wherein said dust collecting case has an inclined upper face.

7. The upright electric vacuum cleaner in accordance with claim 4, wherein said dust collecting case is made of a transparent resin and accommodates therein a cylindrical filter.

8. The upright electric vacuum cleaner in accordance with claim 4, wherein the air and dust taken from a suction port into said dust collecting case are whirled inside said case.

9. The upright electric vacuum cleaner in accordance with claim 4, wherein the air filtered free of said dust in said dust collection unit is taken into an electric blower after it is let out of said dust collecting case and discharged out of the body of said vacuum cleaner through an exhaust filter.

10. A dust collection unit for use with an electric vacuum cleaner having: a dust collecting case for accumulating dust sucked via a suction unit; a hand grip formed on the upper portion of said dust collection unit; a lid member pivotally mounted near the bottom of said dust collecting case by at least one hinge; an outlet for discharging the dust accumulated in said dust collecting case when said lid member is released; a packing provided between said lid member and the periphery of said outlet; a lock mechanism for locking said lid member in a closed condition; and an unlock mechanism for unlocking said lock mechanism, said hand grip facilitating a user to hold said dust collection unit when discharging dust from said outlet, said hand grip arranged to face said user, said hinge arranged at a position which is adjacent to said bottom of said dust collecting case facing said user holding said hand grip, and said lock mechanism arranged near the periphery of said lid member and at a position opposite to said hinge.

11. A dust collection unit for use with an electric vacuum cleaner having: a dust collecting case for accumulating dust sucked via a suction unit; a hand grip formed on the upper portion of said dust collection unit; a lid member pivotally mounted near the bottom of said dust collecting case by at least one hinge; a lock mechanism for locking said lid member in a closed condition; and an unlock mechanism for unlocking said lock mechanism, said hand grip facilitating a user to hold said dust collection unit when discharging dust from the bottom of said dust collecting case, said hand grip arranged to face said user, said hinge arranged at a position which is adjacent to said bottom of said dust collecting case facing said user holding said hand grip, and said lock mechanism arranged near the periphery of said lid member and at a position opposite to said hinge.

12. A dust collection unit for use with an electric vacuum cleaner having: a dust collecting case for accumulating dust sucked via a suction unit; a hand grip formed on the upper portion of said dust collection unit; a lid member pivotally mounted near the bottom of said dust collecting case by at least one hinge; and a lock mechanism for locking said lid member in a closed condition, said dust collection unit provided with a stick for unlocking said lock mechanism, said hand grip facilitating a user to hold said dust collection unit when discharging dust from the bottom of said dust collecting case, said hand grip arranged to face said user, said hinge arranged at a position which is adjacent to said bottom of said dust collecting case facing said user holding said hand grip, and said stick arranged outside said dust collecting case and at the position opposite to said hinge.

13. An upright electric vacuum cleaner having: a suction unit mounted on the lower section of the body of said upright electric vacuum cleaner, a manipulation handle for manipulating the body of said vacuum cleaner that is provided above the body of said vacuum cleaner; and a dust collection unit detachably mounted on the body of said vacuum cleaner, said dust collection unit including:
- a dust collecting case for accumulating dust sucked via said suction unit;
- a hand grip formed on the upper portion of said dust collection unit;
- a lid member pivotally mounted near the bottom of said dust collecting case by at least one hinge;
- an outlet for discharging the dust accumulated in said dust collecting case when said lid member is released;
- a packing provided between said lid member and the periphery of said outlet;
- a lock mechanism for locking said lid member in a closed condition; and
- an unlock mechanism for unlocking said lock mechanism, and said hand grip facilitating a user to hold said dust collection unit when discharging dust from said outlet, said hand grip arranged to face said user, said hinge arranged at a position which is adjacent to said bottom of said dust collecting case facing said user holding said hand grip, and said lock mechanism arranged near the periphery of said lid member and at a position opposite to said hinge.

14. An upright electric vacuum cleaner having: a suction unit mounted on the lower section of the body of said upright electric vacuum cleaner, a manipulation handle for manipulating the body of said vacuum cleaner that is provided above the body of said vacuum cleaner; and a dust collection unit detachably mounted on the body of said vacuum cleaner, said dust collection unit including:
- a dust collecting case for accumulating dust sucked via said suction unit;
- a hand grip formed on the upper portion of said dust collection unit;
- a lid member pivotally mounted near the bottom of said dust collecting case by at least one hinge;
- a lock mechanism for locking said lid member in a closed condition; and
- an unlock mechanism for unlocking said lock mechanism, and said hand grip facilitating a user to hold said dust collection unit when discharging dust from the bottom of said dust collecting case, said hand grip arranged to face said user, said hinge arranged at a position which is adjacent to said bottom of said dust collecting case facing said user holding said hand grip, and said lock mechanism arranged near the periphery of said lid member and at a position opposite to said hinge.

15. An upright electric vacuum cleaner having: a suction unit mounted on the lower section of the body of said upright electric vacuum cleaner, a manipulation handle for manipulating the body of said vacuum cleaner that is provided above the body of said vacuum cleaner; and a dust collection unit detachably mounted on the body of said vacuum cleaner, said dust collecting case including:
- a dust collecting case for accumulating dust sucked via said suction unit;
- a hand grip formed on the upper portion of said dust collection unit;
- a lid member pivotally mounted near the bottom of said dust collecting case by at least one hinge; and
- a lock mechanism for locking said lid member in a closed condition, and said dust collection unit provided with a stick for unlocking said lock mechanism, said hand grip facilitating a user to hold said dust collection unit when discharging dust from the bottom of said dust collecting case, said hand grip arranged to face said user, said hinge arranged at a position which is adjacent to said bottom of said dust collecting case facing said user holding said hand grip, and said stick arranged outside said dust collecting case and at the position opposite to said hinge.

16. An upright electric vacuum cleaner having: a suction unit mounted on the lower section of the body of said upright electric vacuum cleaner, a manipulation handle for manipulating the body of said vacuum cleaner that is provided above the body of said vacuum cleaner; and a dust collection unit detachably mounted on the body of said vacuum cleaner, said dust collection unit including:
- a dust collecting case for accumulating dust sucked via said suction unit;
- a hand grip formed on the upper portion of said dust collection unit;
- a lid member pivotally mounted near the bottom of said dust collecting case by at least one hinge;
- a lock mechanism for locking said lid member in a closed condition; and
- an unlock mechanism for unlocking said lock mechanism, and said dust collection unit detachably mounted on the front side of the body of said vacuum cleaner, said hand grip arranged to face forward the body of said vacuum cleaner, said hinge arranged at the front side of the body of said vacuum cleaner, and said lock mechanism arranged at the back side of the body of said vacuum cleaner.

17. An upright electric vacuum cleaner having: a suction unit mounted on the lower section of the body of said upright electric vacuum cleaner, a manipulation handle for manipulating the body of said vacuum cleaner that is provided above the body of said vacuum cleaner; and a dust collection unit detachably mounted on the body of said vacuum cleaner, said dust collection unit including:
- a dust collecting case for accumulating dust sucked via said suction unit;
- a lid member pivotally mounted near the bottom of said dust collecting case by at least one hinge;
- an outlet for discharging the dust accumulated in said dust collecting case when said lid member is released;
- a lock mechanism for locking said lid member in a closed condition;
- an unlock mechanism for unlocking said lock mechanism; and
- a biasing member for biasing said lid member in the direction in which said lid member is released from said outlet, and said biasing member is adapted to forcibly release said lid member from said outlet by a biasing force when said lock mechanism is unlocked by said unlock mechanism.

* * * * *